United States Patent [19]

Sauerschell et al.

[11] 4,294,108

[45] Oct. 13, 1981

[54] DEVICE FOR MEASURING THE FUEL CONSUMPTION OF A VEHICLE

[75] Inventors: Wolfgang Sauerschell; Karl-Heinz Werkmann, both of Frankfurt am Main, Fed. Rep. of Germany

[73] Assignee: VDO Adolf Schindling AG, Schwalbach, Fed. Rep. of Germany

[21] Appl. No.: 105,932

[22] Filed: Dec. 21, 1979

[30] Foreign Application Priority Data

Feb. 12, 1979 [DE] Fed. Rep. of Germany ....... 2905304

[51] Int. Cl.$^3$ .................................................. G01F 9/02
[52] U.S. Cl. ..................................... 73/119 A; 73/114
[58] Field of Search ............ 73/119 A, 114, 3, 861.75, 73/861.76, 861.81, 861.83

[56] References Cited

U.S. PATENT DOCUMENTS 3,452,596  7/1969  Griffo ................................... 73/3 X
4,073,186  2/1978  Erwin, Jr. .......................... 73/119 A
4,100,803  7/1978  Gass .................................. 73/861.81

FOREIGN PATENT DOCUMENTS 2502599  7/1976  Fed. Rep. of Germany ... 73/861.79

Primary Examiner—Jerry W. Myracle
Attorney, Agent, or Firm—Eric P. Schellin

[57] ABSTRACT

Apparatus for measuring the fuel consumption of a vehicle has a flowmeter in each of a forward fuel flow line and a return fuel flow line, with a device for detecting a difference in the flows and calculating the fuel consumption, wherein a gauging device is associated with at least one of the lines for adjusting the apparatus to obtain identical signals from each of the flowmeters under conditions where forward flow is substantially the same as return flow, thereby eliminating the necessity of selecting matched pairs of flowmeters for the flow lines.

3 Claims, 2 Drawing Figures

DEVICE FOR MEASURING THE FUEL CONSUMPTION OF A VEHICLE

BACKGROUND OF THE INVENTION

The invention relates to a device for measuring the fuel consumption of a vehicle, with means for measuring the fuel forward flow in a forward flow line, and the fuel return flow in a return flow line, having means for detecting the difference between these flows and for the calculation of the fuel consumption based thereon.

Such devices are needed in order to measure the fuel consumption in modern motor vehicles, wherein a fuel forward flow to the carburetor or to an injector, and a fuel return flow of the fuel return flow are to prevent the fuel, even at extreme environmental conditions, from heating up too much, which may cause disturbances in the operation of the motor vehicle. Usually, the fuel forward flow is set to a constant flow, e.g., 120 liters per hour, with an electrically driven fuel pump, and at lower fuel consumption the return flow is approximately just as large.

In the measurement of the fuel consumption by measuring the flows of the fuel forward flow and the fuel return flow by means of the difference therebetween, the problem arises that the differences between great numerical values must be formed, in which computation the errors of measurement in the determination of one of the values corresponding to the forward flow and the return flow may be greater than the difference of these numerical values.

SUMMARY OF THE INVENTION

The principal object of the present invention is therefore to disclose a device for measuring the fuel consumption in a system as described above, which is developed in such a way that such errors of measurement of the flows do not enter the result of measurement or the calculated fuel consumption. The fuel consumption is, in this device, calculated by the least complicated and least expensive means possible.

This object is achieved in the device of the invention by means of a device wherein for the fuel forward flow measurement and the fuel return flow measurement respectively, a turbine flowmeter is provided in the forward flow line and in the return flow line, whose rotation is photoelectrically scanned for the purpose of generating an electric value that corresponds to the forward flow or return flow, the said turbine flowmeters being dimensioned in such a way that they operate, at operative fuel forward flow and at the same fuel return flow, in their linear characteristics area, and that means for gauging are provided and set in such a way that they yield, at operative fuel forward flow and at the same return flow, identical electrical values or a difference of zero between these two electrical values.

Therefore, for the measurement of the fuel consumption, use is made of two turbine flowmeters, known, per se, and which present a characteristic that is, in the usual manner, non-linear in the area of small flows, but very linear at large flows. This phenomenon is caused by the bearing friction of the turbine wheel which appears as disturbing factor especially at low numbers of revolution. The turbine flowmeters are selected in such a way that, at operative fuel forward flow and, when consumption is lacking, at the same fuel return flow, they operate in their linear characteristic area. It is however, not necessary that these characteristics at this forward flow or return flow coincide, i.e., that the turbine flowmeters at the same flow yield identical electrical values which are measured, for example as frequencies of a light barrier interrupted by the impeller. Since the two turbine flowmeters need not present exactly identical characteristics, an expensive selective process in the manufacture of the measuring device is eliminated. Instead, when turbine flowmeters with deviation of the yielded electrical values at identical flow are employed, means for gauging are provided and set in such a way that either the two turbine flowmeters yield identical electrical values at the same flow or, by the means for gauging, an existing difference is adjusted to zero in an evaluation circuit. Due to the good linearity of the characteristic of the turbine flowmeter in the upper flow area, a high accuracy is thus achieved, even at small consumption values, although the turbine flowmeters, due to their exemplary dispersion at the same flow, may yield different values at their outputs.

In an advantageous development of the device, the means provided for gauging in front of the turbine wheel of at least one of the turbine flowmeters consists in an element that affects the flow velocity of the fuel. This element for the mechanical gauging may especially consist of a ring by means of which the flow cross section is narrowed, so that the flow velocity rises, which in turn results in an increasing electrical value at the output of the turbine flowmeter. An advantageous modification which has no mechanical means for the gauging, presents the characteristics that in each case a frequency-voltage converter is connected to photoelectric scanning means of the turbine flowmeters, and that both frequency-voltage converters are connected to a circuit for forming the voltage difference signal, which circuit is connected to a circuit for quotient formation with an electrical value proportional to the speed of the vehicle, and that the means provided for gauging consists of at least one adjustable electrical structural element in this circuit.

In this device, therefore, the gauging takes place without engagement of the turbine flowmeters, by electrical structural means adjustable in a simple manner, which structural means are preferably arranged in signal flow direction, in connection to the frequency voltage converter, or form a constituent thereof.

BRIEF DESCRIPTION OF THE DRAWINGS

The invention will be explained in the following, with the aid of the drawings, wherein.

DETAILED DESCRIPTION OF THE PREFERRED EMBODIMENTS

Figure 1:
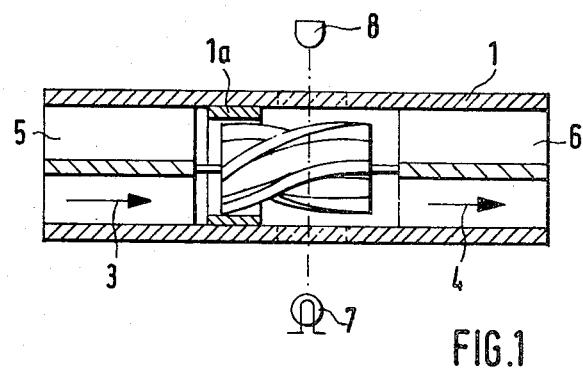
FIG. 1 is a view of a turbine flowmeter in longitudinal section.

In FIG. 1, numeral 1 indicates the wall or body of a turbine flowmeter in whose longitudinal bore a turbine wheel 2 with several blades is rotatably supported. The flow direction of the fuel in the turbine flowmeter is indicated with arrows 3 and 4. In the tubular body formed by wall 1, flow rectifiers or guides 5 and 6 are provided on the inlet and outlet sides of the turbine wheel which consists of fixed lamina arranged crosswise with respect to each other in cross section.

A light source 7 and a photoelectric element 8 are provided outside the body adjacent the turbine wheel in such a way that the rays emanating from light source 7 are interrupted by the blades of the turbine wheel at certain rotational positions of the turbine wheel, but pass through to the photoelectric element at other positions of the turbine wheel. Wall 1 consists for this purpose, at least in the area of the light source and the photoelectric element, of transparent material. The light source and the photoelectric element form an electric transmitter which yields an electrical value proportional to the number of revolutions of the turbine wheel.

Furthermore, in FIG. 1 a diagrammatically drawn ring is indicated at 1a and comprises a means for gauging, and is operable to narrow the flow cross section in the area of the turbine wheel in order to produce a higher flow velocity at a prespecified flow rate.

Figure 2:
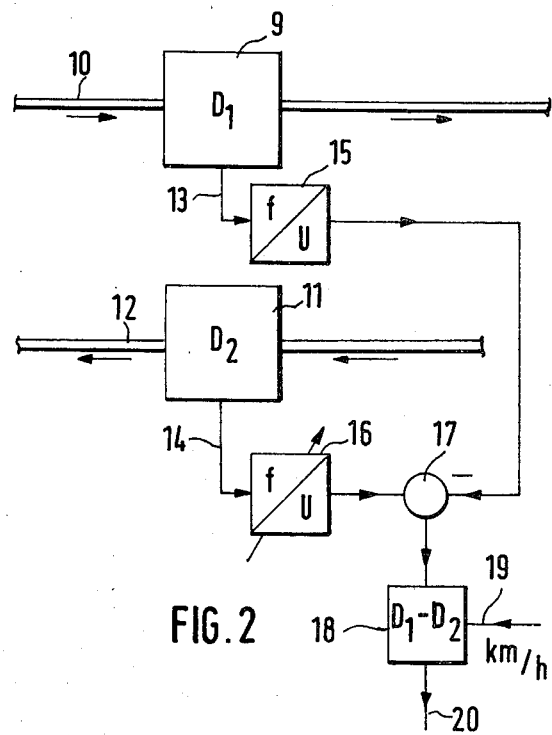
FIG. 2 is a diagrammatical illustration of the device for measuring the fuel consumption, with employment of two turbine flowmeters according to FIG. 1.

An alternate means of gauging is shown in FIG. 2, wherein numeral 9 indicates a diagrammatically shown turbine flowmeter with a photoelectric element for yielding a frequency, which flowmeter is arranged in a forward flow line 10. Reference numeral 11 indicates a corresponding turbine flowmeter in a return flow line 12. From turbine flowmeters 9 and 11, lines 13 and 14 lead respectively, to frequency-voltage converters 15 and 16. At the output side, the two frequency-voltage converters are connected to a difference former 17 which, in turn, is connected to a device 18 for quotient formation. This device 18 is given at one input 19 a value which is proportional to the speed of the vehicle, and yields correspondingly at its output 20 a value which is formed from the difference of the fuel forward flow and the fuel return flow divided by the speed, and therefore indicates the fuel consumption per kilometer or, in a different dimensioning, per 100 kilometers.

As a means for gauging the turbine flowmeters, at least one of the two turbine flowmeters 9 and 10 can be provided with a ring 1a of such shape that both turbine flowmeters transmit the same frequency to lines 13 and 14, when the flow in forward and return lines is identical, i.e. when the fuel consumption equals zero.

Instead of this, however, it is possible to retain the exemplary dispersion of turbine flowmeters 9 and 11, and it is possible, at the same flow through turbine flowmeters 9 and 11, that at least one of the frequency-voltage converters, here the frequency-voltage converter 16, or in another embodiment, an adjustable structural element connected in series to the said frequency-voltage converter so as to follow it, can be adjusted in such a way that the difference former produces a voltage difference of zero.

Thus, with relatively few expensive turbine flowmeters, since they need not be selected as matched pair for a device for measuring the fuel consumption, an exact measurement of the fuel consumption is possible.

We claim:

1. A device for measuring the fuel consumption of a vehicle, with means for measuring the fuel flow in a forward flow line, and means for measuring the fuel return flow in a return flow line, having means for detecting the difference between these flows and for the calculation of the fuel consumption, characterized in that, for the measurement of the fuel forward flow and of the fuel return flow, respectively, a turbine flowmeter is connected in each of the forward flow line and the return flow line and photoelectric means is positioned to scan the rotation of each for the generation of an electrical value corresponding to the forward flow or return flow, and that means for gauging are provided in one of said means for measuring the fuel flow in said forward flow line and in said means for measuring the fuel return flow in said return flow line to adjust the measurement in said one means to correspond with the measurement in said other means, for obtaining identical electrical values at operative fuel consumption and at the same forward fuel flow and return fuel flow.

2. A device as in claim 1, wherein the means for gauging comprises an element in at least one of the flow lines, in front of the turbine flowmeter, that affects the flow speed of the fuel.

3. A device for measuring the fuel consumption of a vehicle, with means for measuring the fuel flow in a forward flow line, and the fuel return flow in a return flow line, having means for detecting the difference between these flows and for the calculation of the fuel consumption, characterized in that, for the measurement of the fuel forward flow and of the fuel return flow, respectively, a turbine flowmeter is connected in each of the forward flow line and the return flow line and photoelectric means is positioned to scan the rotation of each for the generation of an electrical value corresponding to the forward flow or return flow, and that means for gauging are provided for obtaining identical electrical values at operative fuel consumption and at the same forward fuel flow and return fuel flow characterized further in that frequency-voltage converters are connected to the photoelectric means and furthermore, that the frequency-voltage converters are connected to a circuit for voltage difference formation which is connected to a circuit for quotient formation having an electrical value input proportional to the speed of the vehicle, and that the means for gauging comprises at least one adjustable element in this circuit.

* * * * *